United States Patent [19]
Nowlin

[11] Patent Number: 5,180,142
[45] Date of Patent: Jan. 19, 1993

[54] DEVICE FOR UPROOTING TREES

[76] Inventor: Forrest D. Nowlin, Rte. 1, box 44, Farris, Okla. 74542

[21] Appl. No.: 702,358

[22] Filed: May 15, 1991

Related U.S. Application Data

[63] Continuation of Ser. No. 599,313, Oct. 17, 1990, abandoned.

[51] Int. Cl.$^5$ .............................................. E21B 19/00
[52] U.S. Cl. .................................................. 254/132
[58] Field of Search .................. 254/132, 29 R, 30–31, 254/124; 37/2 R, 2 P; 144/34 R, 2 N, 193 R, 193 B

[56] References Cited

U.S. PATENT DOCUMENTS

| | | | |
|---|---|---|---|
| 2,249,907 | 7/1941 | Perkowski | 254/30 |
| 2,462,314 | 2/1949 | Fuqua | 37/2 P |
| 2,650,063 | 8/1953 | Hawkins | 37/2 R |
| 2,662,729 | 12/1953 | Fountain . | |
| 2,681,789 | 6/1954 | Nichols | 254/132 |
| 2,693,650 | 11/1954 | Struemph | 254/132 |
| 2,803,431 | 8/1957 | Cooper . | |
| 3,057,599 | 10/1962 | Clatterbuck . | |
| 3,116,048 | 12/1963 | Irwin et al. | 37/2 R |
| 3,201,089 | 8/1965 | Napoletana | 354/124 |
| 3,460,594 | 8/1969 | Burkhalter . | |
| 3,802,663 | 4/1974 | Widegren et al. . | |
| 3,823,916 | 6/1974 | Shaw . | |
| 3,946,988 | 3/1976 | Kelven | 254/30 |
| 4,067,369 | 1/1978 | Harman | 37/2 R |
| 4,108,224 | 8/1978 | Wirt . | |
| 4,126,235 | 11/1978 | Wirt . | |
| 4,141,398 | 2/1979 | Widegren et al. | 37/2 R |
| 4,244,560 | 1/1981 | Hawkins . | |

Primary Examiner—Robert C. Watson
Attorney, Agent, or Firm—Dunlap, Codding & Lee

[57] ABSTRACT

A device for uprooting trees and brush. The device is ridigly constructed of quarter inch rectangular tubing and comprises a substantially horizontal V-shaped tree engaging member preferably having elongate blades thereon for gripping the trunk of the tree to be uprooted. An upper Y-shaped member, extending over the tree engaging member member, may be included for supporting the upper part of the tree being uprooted. The device is used by attaching it to a truck or tractor or some other suitable vehicle and pushing the tree engaging member against the tree until it is forced out of the ground. The surrounding terrain is relatively undisturbed.

13 Claims, 2 Drawing Sheets

DEVICE FOR UPROOTING TREES

This is a continuation of co-pending application Ser. No. 07/599,313 filed on Oct. 17, 1990, now abandoned.

FIELD OF THE INVENTION

The present invention relates generally to devices for uprooting trees, and in particular to devices which are attachable to vehicles.

SUMMARY OF THE INVENTION

The present invention comprises a device for uprooting trees. The device comprises a frame adapted for attachment to a vehicle. A tree engaging member for engaging the trunk of the tree to be uprooted is included. The tree engaging member comprises a pair of laterally diverging arms rigidly attached to the frame so that the tree engaging member is supported substantially parallel to the ground when the frame is attached to the vehicle.

Further, the present invention includes a device for uprooting trees which device consists essentially of a frame adapted for attachment to a vehicle, a tree engaging member for engaging the trunk of the tree to be uprooted, and a Y-shaped member for supporting the upper portion of the tree being uprooted. The frame comprises a horizontal portion and a vertical portion extending upward from the horizontal portion, so that the frame is adapted for connection to a three-point hitch. The tree engaging member comprises a pair of laterally diverging arms rigidly attached to the frame at the center of the horizontal portion so that the tree engaging member is supported substantially parallel to the ground when the frame is attached to the vehicle. The Y-shaped member is rigidly attached to the vertical portion of the frame generally above and generally parallel to the tree engaging member.

Still further, the present invention includes a device for uprooting trees, consisting essentially of a frame adapted for attachment to a vehicle and a tree engaging member for engaging the trunk of the tree to be uprooted. The tree engaging member comprises a pair of laterally diverging arms rigidly attached to the frame so that the tree engaging member is supported substantially parallel to the ground when the frame is attached to the vehicle.

DETAILED DESCRIPTION OF THE PREFERRED EMBODIMENT

Figure 1:
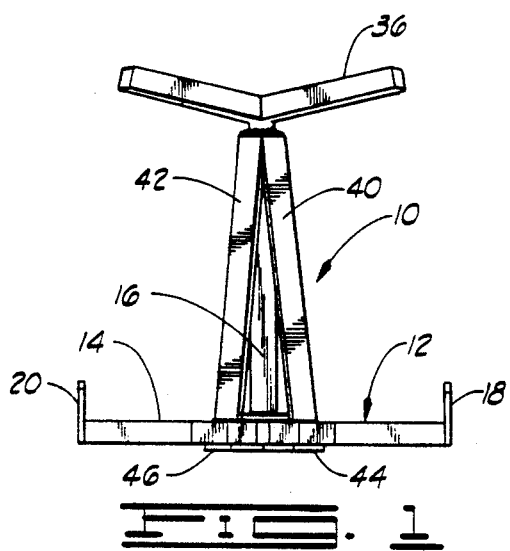
FIG. 1 is a front elevational view of a device for uprooting trees in accordance with the present invention.
Figure 2:
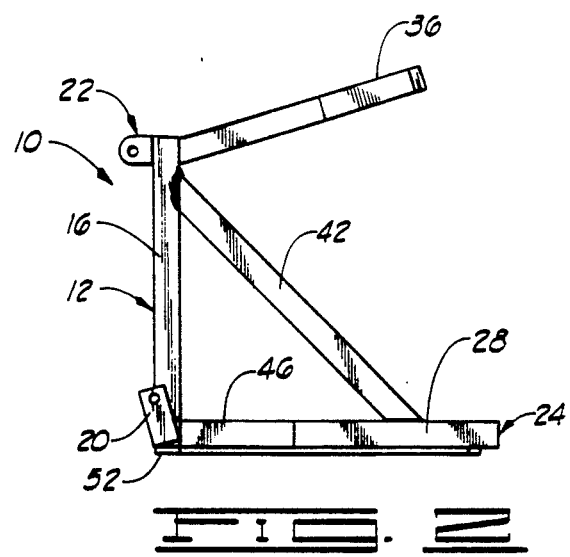
FIG. 2 is a side elevational view of the device shown in FIG. 1.
Figure 3:
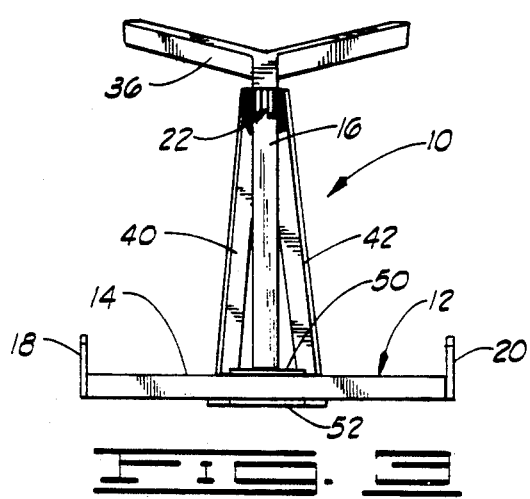
FIG. 3 is a rear elevational view of the device shown in FIG. 1.
Figure 4:
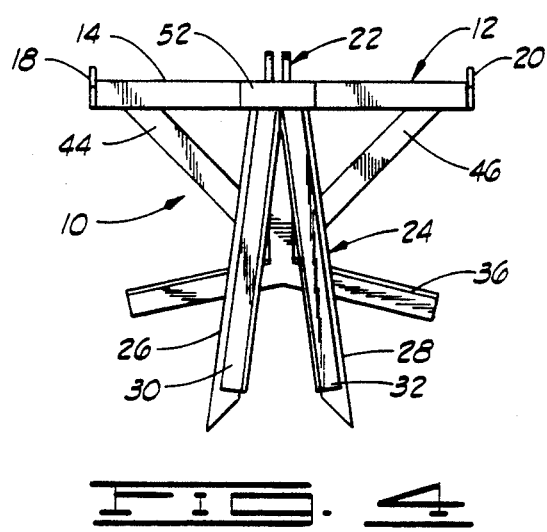
FIG. 4 is a bottom view of the device shown in FIG. 1.
Figure 5:
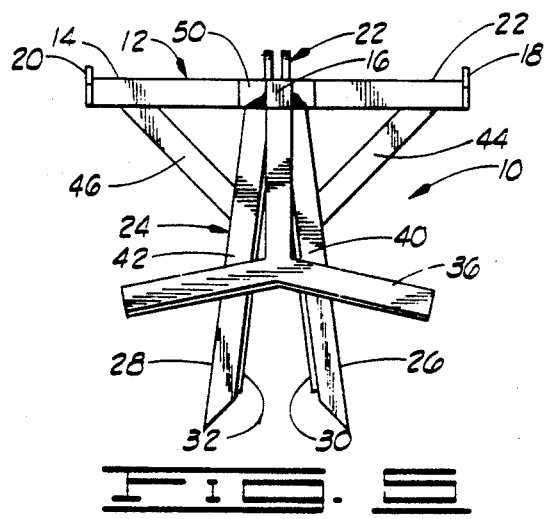
FIG. 5 is a plan view of the device shown in FIG. 1.

The present invention is directed to a device for uprooting trees. The device is simple and inexpensive to build and easy to use. The device permits the removal of trees and brush without substantially disturbing the surrounding terrain. Other advantages will be apparent from the following description.

With reference now to the drawings in general and to FIGS. 1-5 in particular, there is shown therein a device constructed in accordance with the present invention and designated generally by the reference numeral 10. As indicated, the device is for uprooting trees, and as used herein "trees" includes stumps and brush as well as poles or posts, which need to be uprooted or pulled from the ground.

The device 10 comprises a frame 12. The frame preferably comprises a horizontal portion, which may be defined simply by a bar 14. The preferred frame further comprises a vertical portion, and this vertical portion may be a bar 16 extending upward from the center of the horizontal bar 14.

The frame 12 is adapted for attachment to a vehicle, such as a tractor or truck. To this end, hitch attachment plates 18, 20 and 22 are rigidly fixed to the ends of the horizontal bar 14 and to the top of the vertical bar 16, respectively. By means of the plates 18, 20 and 22 the frame 12 can be removably connected to a standard three point hitch (not shown) in a conventional manner.

The device 10 comprises a tree engaging member 24 for engaging the trunk of the tree to be uprooted. The tree engaging member 24 comprises a pair of laterally diverging arms 26 and 28. The arms 26 and 28 are rigidly attached to the frame 12, and preferably are attached to the center of the horizontal bar 14. The arms 26 and 28 should be positioned relative to the frame 12 so that when the frame is attached to the vehicle the tree engaging member 24 is supported substantially parallel to the ground.

Figure 6:
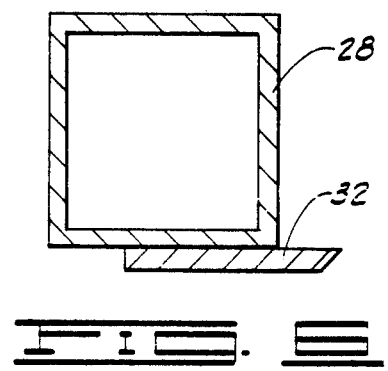
FIG. 6 is an enlarged sectional view of one of the arms of the tree engaging member of the device of the present invention.

Blades 30 and 32 are attached to the underside of the arms 26 and 28, respectively. An enlarged sectional view of the arm 28 and blade 32 is shown in FIG. 6, the other arm 26 and blade 30 being the mirror image thereof. As seen, the cutting edge of the blade extends a distance, such as about one half inch, toward the inside of the arm. A suitable blade may be made by cutting a road grader blade down to a length slightly less than the length of the arm. In this way, as the member 24 is pushed against the tree, in a manner yet to be described, the blades 30 and 32 cut into the trunk of the tree and thereby securely engage the tree.

It is advantageous also to provide the device 10 with a Y-shaped member 36. The Y-shaped member 36 preferably is rigidly fixed to the frame generally above the tree engaging member 24. Where the frame comprises a vertical bar 16, as in the embodiment described herein, the Y-shaped member 36 can be attached to the top of the vertical bar 16. Thus positioned, the Y-shaped member serves to support the upper portion of the tree being uprooted.

For increased strength, vertical support members 40 and 42 may be included, extending from the top of the vertical bar 16 to near the end of the arms 26 and 28. Construction is simplified by welding the upper ends of the vertical support members 40 and 42 to steel plate (not shown) which in turn is welded to the top of the vertical bar 16.

Lateral support members 44 and 46 preferably also are provided and extend between a point near the ends of the horizontal bar 14 to a point along the midportion of the arms 26 and 28. Still further, reinforcing plates 50 (FIGS. 3 and 5) and 52 (FIGS. 2, 3 and 4) may be welded to the top and bottom of the horizontal bar 14.

The entire device 10 should be constructed of some suitably sturdy and weather resistant material. Three and one half inch square, quarter wall tubing is ideal. The components should be rigidly fixed together by welding or some like means so as to be integral. Thus constructed, the device will be sturdy and require virtually no maintenance or repair.

Figure 7:
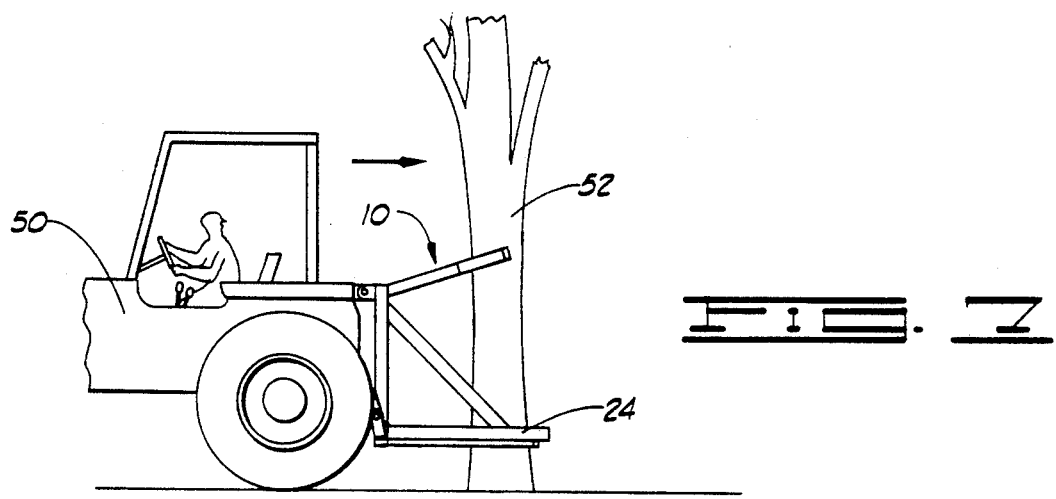
FIGS. 7-9 show the device attached to a small tractor being operated to remove a tree.
Figure 8:
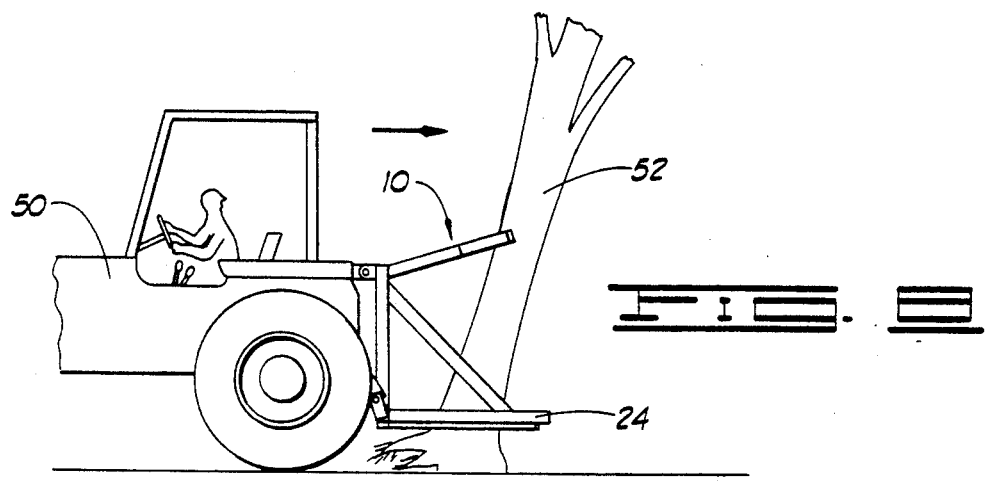
Figure 9:
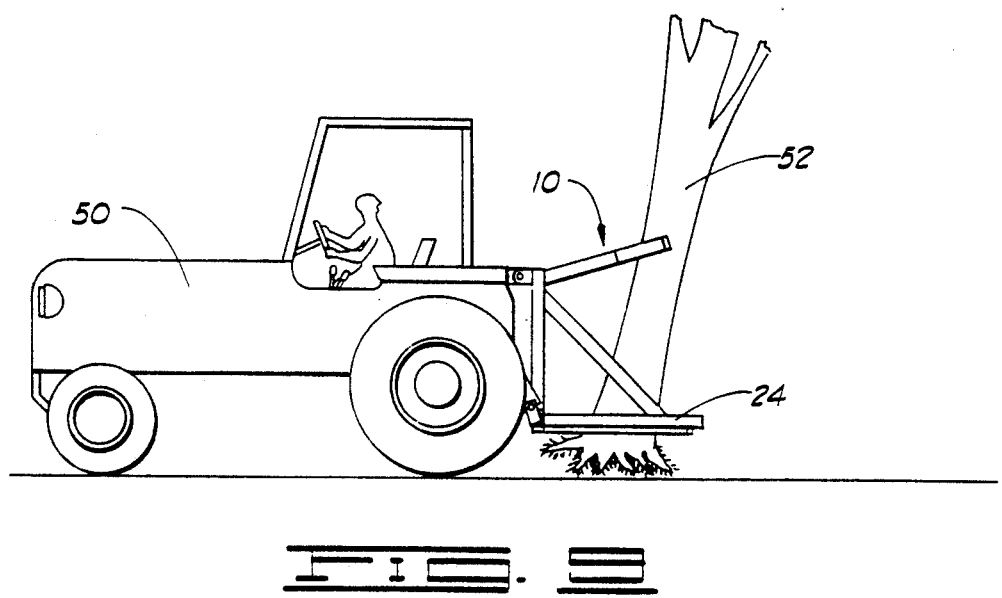

The operation of the device 10 is depicted in FIGS. 7-9, to which attention now is directed. The device 10 is shown attached to the three point hitch of a small tractor 50. It should be noted that one of the advantages of the present invention is that the device 10 can be attached to any size tractor or truck. For example, a small 35 horsepower tractor serves well to operate the device.

With the device 10 supported about 12 inches above the ground, the vehicle 50 is driven in reverse, directing the tree engaging member 24 toward the trunk of the tree 52 to be uprooted. The vehicle 50 is continued in reverse, urging the device 10 against the tree 52 until the tree is pulled from the ground as shown in FIGS. 8 and 9.

Most tractor hitches can be raised and lowered hydraulically. While vertical movement of the hitch, in addition to the pushing action of the vehicle, may be useful in some instances, it is not necessary for successful operation of the device. Due to the unique, rigid construction of the device of this invention, most trees and brush can be removed easily by unidirectional pushing action. Moreover, because a relatively small rubber tired vehicle can be used to operate the device, the terrain surrounding the tree to be uprooted will be left relatively undisturbed.

Changes may be made in the combination and arrangement of the various parts, elements, steps and procedures described herein without departing from the spirit and scope of the invention as defined in the following claims.

What is claimed is:

1. A device for uprooting trees, comprising:
   a tree engaging member for engaging the trunk of the tree to be uprooted, the tree engaging member comprising a pair of rigid, laterally diverging arms; and
   a frame for supporting the tree engaging member, the frame comprising a horizontal portion and a vertical portion for connecting the device to a three-point hitch on a vehicle, the tree engaging member being rigidly attached to the frame so as to be non-movable with respect to the frame, wherein the tree engaging member is supported substantially parallel to the ground when the frame is attached to the vehicle, and wherein the entire frame is rigid and non-jointed so that there is substantially no movement within the frame relative to the point of attachment to the vehicle or to the tree engaging member during operation of the device.

2. The device of claim 1 further comprising:
   a Y-shaped member for supporting the upper portion of the tree being uprooted, the Y-shaped member being rigidly attached to the frame a distance above the tree engaging member.

3. The device of claim 2 wherein the frame, the tree engaging member and the Y-shaped member are integral.

4. The device of claim 2 wherein the frame comprises a horizontal bar and a vertical bar extending upward from the center of the horizontal bar, whereby the frame is adapted for connection to a three-point hitch, wherein the tree engaging member is attached at the center of the horizontal bar and the Y-shaped member is attached at the top of the vertical bar.

5. The device of claim 1 further comprising:
   a blade attached to each of the arms of the tree engaging member, the blade extending towards the inside of the tree engaging member for cutting into the trunk of the tree when the tree engaging member engages the tree.

6. The device of claim 1 wherein the horizontal portion of the frame comprises a horizontal bar, to which the tree engaging member is attached, and the vertical portion comprises a vertical bar extending upward from the center of the horizontal bar.

7. A device for uprooting trees, consisting essentially of:
   a frame adapted for attachment to a vehicle, wherein the frame comprises a horizontal portion and a vertical portion extending upward from the horizontal portion, so that the frame is adapted for connection to a three-point hitch;
   a tree engaging member for engaging the trunk of the tree to be uprooted, the tree engaging member comprising a pair of laterally diverging arms rigidly attached to the frame at the center of the horizontal portion so that the tree engaging member is supported substantially parallel to the ground when the frame is attached to the vehicle; and
   a Y-shaped member for supporting the upper portion of the tree being uprooted, the Y-shaped member being rigidly attached to the vertical portion a distance above the tree engaging member.

8. The device of claim 7 wherein the horizontal portion of the frame is defined by a bar and wherein the vertical portion of the frame is defined by a bar extending upward from the center of the horizontal portion.

9. The device of 8 wherein the frame, the tree engaging member and the Y-shaped member are integral.

10. A device for uprooting trees, consisting essentially of:
    a tree engaging member for engaging the trunk of the tree to be uprooted, the tree engaging member comprising a pair of rigid, laterally diverging arms; and
    a frame for supporting the tree engaging member, the frame comprising a horizontal portion and a vertical portion so that the frame is adapted for connection to a three-point hitch on a vehicle, the tree engaging member being rigidly attached to the frame so as to be non-movable with respect to the frame, wherein the tree engaging member is supported substantially parallel to the ground when the frame is attached to the vehicle, and wherein the entire frame is rigid and non-jointed so that there is substantially no movement within the frame relative to the attachment point to the vehicle or to the tree engaging member during operation of the device.

11. The device of claim 10 wherein the horizontal portion is a horizontal bar and the tree engaging member extends from the center of the horizontal bar.

12. The device of claim 11 wherein the vertical portion of the frame is a vertical bar extending upward from the center of the horizontal bar and wherein the device further includes a Y-shaped member for supporting the upper portion of the tree being uprooted, the Y-shaped member being rigidly attached to the frame at the top of the vertical bar a distance above the tree engaging member.

13. The device of claim 12 wherein the frame, the tree engaging member and the Y-shaped member are integral.

* * * * *